May 18, 1937.  L. G. SPETH  2,080,973
ROTARY TOOL
Filed July 23, 1934
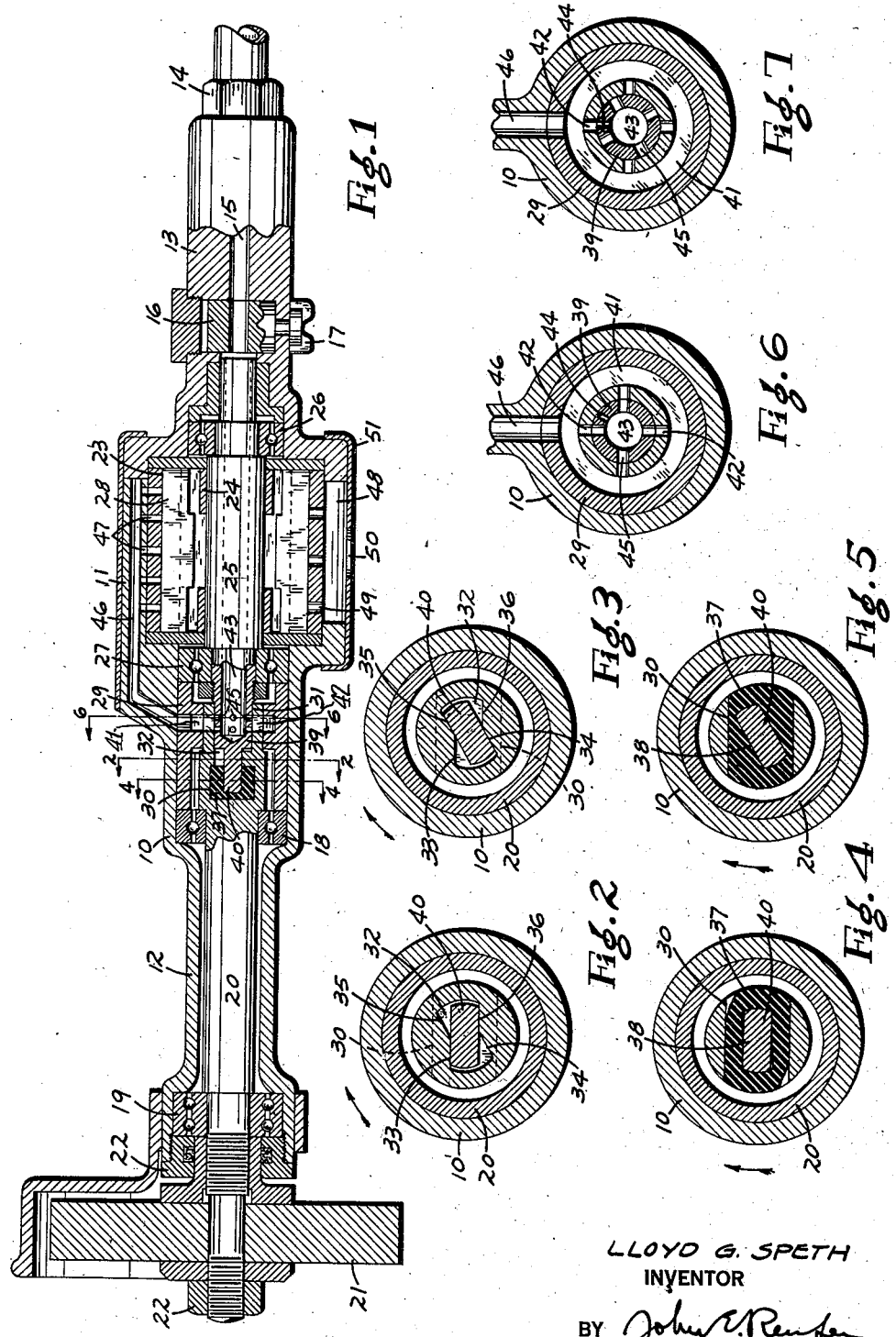
LLOYD G. SPETH
INVENTOR
BY John E. Renfer
ATTORNEY Patented May 18, 1937

2,080,973

UNITED STATES PATENT OFFICE 2,080,973

ROTARY TOOL

Lloyd G. Speth, Claridon, Ohio, assignor to The Cleveland Pneumatic Tool Company, Cleveland, Ohio, a corporation of Ohio Application July 23, 1934, Serial No. 736,511

8 Claims. (Cl. 121—34)

This invention relates broadly to fluid actuated tools, but more particularly to fluid actuated tools of the rotary type.

One object of this invention is to produce a fluid actuated rotary tool with a device capable of automatically controlling the speed and power of the tool proportionally to the load applied thereto.

Another object of this invention is to provide a connection between the driving and the driven members of a rotary tool which is capable of absorbing the jars or vibrations usually imparted to the tool due to a variation of the torque resistance applied to the driven member.

Other objects and advantages more or less ancillary to the foregoing and the manner in which the various objects are attained, reside in the specific construction and aggroupment of the elements peculiar to this structure, as will become apparent from a more complete examination of this specification in the claims of which there are assembled certain specific combinations of parts and specific constructions indicative of the scope and spirit of the invention.

In the drawing which illustrates the invention:

Fig. 1 is a longitudinal sectional view of a rotary tool embodying the invention.

Fig. 2 is an enlarged cross sectional view taken in a plane indicated by line 2—2 in Fig. 1.

Fig. 3 is a view similar to Fig. 2 illustrating one part of the mechanism in a different position.

Fig. 4 is an enlarged cross sectional view taken in a plane indicated by line 4—4 in Fig. 1.

Fig. 5 is a view similar to Fig. 4 illustrating the parts of the driving connection in a different position.

Fig. 6 is an enlarged cross sectional view taken in a plane indicated by line 6—6 in Fig. 1.

Fig. 7 is a view similar to Fig. 6 illustrating some of the parts shown therein in a different position.

Referring to the drawing in which like symbols designate corresponding parts throughout the several views, 10 represents the housing of a rotary tool such as a grinder. This housing is formed with an enlarged portion 11 and a restricted portion forming a tubular handle 12 extending therefrom. Secured to the outer end of the enlarged portion 11, there is another handle 13 conveniently machined to receive a motive fluid connection 14, which is capable of communication with the interior of the housing 10 through a port 15 centrally disposed through the handle 13. At a convenient distance from the end of this handle, the latter is provided with a transversally disposed bore accurately machined to receive a throttle valve 16 operable by a handle 17 for controlling the flow of the motive fluid through the port 15.

Secured within the tubular handle 12, there is a duality of ball bearings 18 and 19 adapted to receive the end portions of a shaft 20 which is rotatable within the tubular handle 12. The shaft 20 protrudes from the tubular handle 12 to receive a tool or grinding wheel 21, which is secured thereon by means of nuts 22.

The interior of the enlarged portion 11 of the housing 10 is machined to form the conventional rotor chamber 23 adapted to accommodate a rotor 24 which is integrally affixed to a shaft 25 having the end portions thereof rotatably mounted within suitable ball bearings 26 and 27. The rotor 24 is of the common blade type having blades 28 radially movable therein for constant engagement with the internal wall of the rotor chamber.

Interposed between the ball bearings 18 and 27, there is a stationary bushing 29 adapted to rotatably receive in fluid tight engagement therewith the free end portion of the shaft 20, which extends from the ball bearing 18. Adjacent the end of the shaft 20 within the bushing 29, the former is provided with a transversally disposed slot 30. Leading from the outer end of the portion of the shaft 20 within the bushing 29, there is a centrally disposed cylindrical bore 31 capable of constant communication with the tranversally disposed slot 30 through an opening 32 formed through the dividing wall between the slot 30 and the bottom of the bore 31. This opening is of a selected shape defining walls 33, 34, 35, and 36. Disposed within the slot 30, there is a member 37 made of resilient material such as rubber. This member is formed with a cavity 38 of substantially rectangular cross section. The bore 31 is accurately machined to receive, in fluid tight engagement therewith the end portion 39 of the shaft 25 extending therein from the ball bearing 27. This end portion 39 of the shaft 25 is terminated by a tongue 40 passing through the opening 32 into the cavity 38 formed within the resilient member 37 for close fit engagement therein.

Formed within the bushing 29, there is an internal annular groove 41 capable of constant communication with slots 42 radially disposed within the end portion of the shaft 20 rotatable within the bushing 29. The shaft 25 is formed with a centrally disposed port 43 through which the motive fluid passing through the throttle valve 16 is free to flow. Leading from the port 43 to the periphery of the shaft 25, there is a radially disposed relatively small port 44 and four larger ports 45, which are all capable of communication with the slots 42 provided within the adjacent end portion of the shaft 20 for admitting motive fluid from the port 43 into the internal annular groove 41. The groove 41 opens into an enlarged port 46 located within the enlarged portion 11 of the housing 10, which port is in constant communication with a plurality of smaller ports 47 opening into the rotor chamber 23. Leading from the rotor chamber 23 into an exhaust chamber 48 formed within the wall of the housing 10, there is a plurality of ports 49; and leading from the exhaust chamber 48 to the atmosphere there is a port 50 which is provided through an exhaust deflector 51.

In the normal operation of the mechanism, the motive fluid from its source of supply is admitted into the port 15 through the connection 14. With the throttle valve positioned as illustrated in Fig. 1, the motive fluid is free to flow through the throttle valve 16 into the port 43 of the shaft 25. When the grinding wheel 21 is free to rotate without any load applied thereto, the restricted port 44 is positioned as illustrated in Fig. 7, thus permitting a restricted amount of motive fluid to be admitted into the rotor chamber 23 through one of the radially disposed slots 42, the annular internal groove 41, the port 46 and the ports 47. The motive fluid admitted into the rotor chamber 23, will act on the blades 28 for imparting rotation to the rotor 24 and consequently to the shaft 25. From the rotor chamber 23, motive fluid will exhaust to the atmosphere through the ports 49, the exhaust chamber 48 and the port 50. The amount of the motive fluid thus admitted into the rotor chamber 23 through the restricted port 44 is calculated to produce the maximum free speed of the rotor. The rotary motion of the shaft 25 is transmitted to the shaft 20, and consequently to the grinding wheel 21, through the engagement of the tongue 40 with the resilient member 37 secured within the transversely disposed slot 30. The grinding wheel being free to rotate, the shaft 25 will not rotate relative to the shaft 20, thus the position of the tongue 40 relative to the shaft 20 and the resilient member 37 will remain as shown in Figs. 3 and 5.

When a load is applied on the grinding wheel 21, it will momentarily slow the speed of rotation of the shaft 20. The speed of rotation of the shaft 25 remaining substantially the same, the tongue 40 integral with the shaft 25 will cause the deflection of the resilient member 37, thus permitting a relative rotation of the shaft 25 with respect to the shaft 20 until the tongue 40 engages the side walls 33 and 36 of the opening 32 for transmitting the rotation of the shaft 25 to the shaft 20. During the limited relative rotation of the shaft 25 with the shaft 20, the ports 45 formed within the end portion 39 of the shaft 25 will also rotate relative to the slots 42 formed within the shaft 20. Due to this relative rotation, the ports 45 will gradually move from the position shown in Fig. 7 into the position shown in Fig. 6, that is into communication with the radially disposed slots 42 for admitting an additional amount of pressure fluid into the rotor chamber 23, thus increasing the power of rotation of the motor. When the load is removed fron the grinding wheel 21, the resilient member 37 will immediately resume its original position, thus again causing a relative rotation of the shafts 20 and 25 until the tongue 40 engages the side walls 34 and 35 of the opening 32. In this instance, the ports 45 will be moved from the position shown in Fig. 6 to the position shown in Fig. 7, wherein the restricted port 44 is again in communication with the radially disposed slots 42 for admitting a restricted amount of motive fluid into the rotor chamber 23.

In the present construction, it will be understood that the power of the motor is automatically and gradually increased as the torque resistance is applied to the motor, and that the power is similarly reduced when the load is removed from the tool, thus relieving the operator from constantly regulating the power and speed of the tool by regulating the admission of the motive fluid therein, and also preventing the grinding wheel to be rotated at an inordinate rate of speed.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a portable tool, the combination of a housing having motive fluid admitted therein, a motive fluid actuated element rotatable within said housing, a load receiving member rotatably driven by said element, said member and element being capable of relative rotation due to a variation of the load applied to the former, and motive fluid conveying ports through said member and element capable of intercommunication for admitting motive fluid into said housing, said ports being movable by virtue of said relative rotation into more or less complete communication for controlling the amount of motive fluid admitted into said housing.

2. In a portable tool, the combination of a housing having motive fluid admitted therein, a motive fluid actuated element rotatable within said housing, a load receiving member rotatably driven by said element, said member and element being capable of relative rotation due to a variation of the load applied to the former, and cooperating means carried by said member and element operable by virtue of said relative rotation for varying the amount of the motive fluid admitted into said housing.

3. In a portable tool, the combination of a housing, a motive fluid actuated element rotatable within said housing, a load receiving rotatable shaft, a resilient member connecting said element and said shaft for normally transmitting the rotation of the former to the latter, said resilient member being twistable to permit a relative rotation between said element and said shaft, and means independent of said resilient member for limiting the twist of the latter and establishing a rigid connection between said element and said shaft for transmitting the rotation of the former to the latter when the latter is subjected to a predetermined torque resistance.

4. In a portable tool, the combination of a fluid actuated rotatable member, a load receiving member, a connection between said members for transmitting the rotation of the former to the latter, means included in said connection whereby said members are capable of relative rotation, and means on each of said members capable of interengagement for limiting said relative rotation and transmitting the rotation of said rotatable member to said load receiving member independently of said connection.

5. In a portable tool, the combination of a housing having motive fluid admitted therein, a motive fluid actuated element rotatable within said housing, a load receiving member rotatably driven by said element, a resilient connection between said member and element affording relative rotation between said member and element due to a variation of the load applied to the former, and motive fluid conveying means within said member and element movable into more or less complete communication with each other due to said relative rotation for controlling the amount of motive fluid admitted into said housing.

6. In a portable tool, the combination of a housing having motive fluid admitted therein, a motive fluid actuated element rotatable within said housing, a load receiving member rotatably driven by said element, said member being momentarily capable of rotation at a different rate of speed from that of said element due to a variation of the load applied to said member, and co-operating means carried by said member and element operable by virtue of the different rate of speed aforesaid for varying the amount of the motive fluid admitted into said housing.

7. In a portable tool, the combination of a motive fluid actuated motor, a motor shaft rotatable by said motor, a load receiving shaft, connecting means between said shafts for transmitting rotation from said motor shaft to said load receiving shaft, said connecting means including yieldable means within one of said shafts operatively associated with the other for permitting relative rotation therebetween due to a variation of the load applied to said load receiving shaft, means for admitting motive fluid into said motor, and means operable due to said relative rotation for controlling the amount of the motive fluid admitted into said motor.

8. In a portable tool, the combination of a driving and a driven element, a fluid actuated motor operatively associated with said driving element for rotating the same, a rotation transmitting connection between said elements including means within one of said elements operatively associated with the other for permitting relative rotation therebetween, means for admitting motive fluid to said motor, and means operable by virtue of said relative rotation for controlling the amount of the motive fluid admitted into said motor.

LLOYD G. SPETH.